US006966118B2

(12) United States Patent
Sano (10) Patent No.: US 6,966,118 B2
(45) Date of Patent: Nov. 22, 2005

(54) ABSOLUTE ANGLE DETECTING DEVICE

(75) Inventor: Tadashi Sano, Miyagi-ken (JP)

(73) Assignee: Alps Electric Co., Ltd.

( * ) Notice: Subject to any disclaimer, the term of this patent is extended or adjusted under 35 U.S.C. 154(b) by 0 days.

(21) Appl. No.: 10/900,892

(22) Filed: Jul. 28, 2004

(65) Prior Publication Data

US 2005/0022396 A1   Feb. 3, 2005

(30) Foreign Application Priority Data

Jul. 31, 2003  (JP)  ............................. 2003-204661
Jul. 31, 2003  (JP)  ............................. 2003-204663

(51) Int. Cl.⁷ .......................... G01B 21/22; H03M 1/22
(52) U.S. Cl. ........................................ 33/1 PT; 341/3
(58) Field of Search .............................. 33/1 N, 1 PT, 33/534, 706–708; 341/3, 11

(56) References Cited

U.S. PATENT DOCUMENTS

| | | | | |
|---|---|---|---|---|
| 4,512,667 A | * | 4/1985 | Doulton et al. ............... | 368/10 |
| 5,129,725 A | * | 7/1992 | Ishizuka et al. .............. | 33/707 |
| 5,438,330 A | * | 8/1995 | Yamazaki et al. ............ | 341/11 |
| 5,442,858 A | * | 8/1995 | Wolters et al. ............... | 33/1 N |
| 5,663,794 A | * | 9/1997 | Ishizuka ...................... | 356/499 |
| 5,739,775 A | * | 4/1998 | Brandestini .................. | 341/10 |
| 6,170,162 B1 | * | 1/2001 | Jacobsen et al. ............ | 33/1 PT |
| 6,653,620 B2 | * | 11/2003 | Blasing et al. ............... | 341/11 |
| 2003/0177649 A1 | * | 9/2003 | Ito et al. ...................... | 33/1 PT |

FOREIGN PATENT DOCUMENTS

JP    2000-028396    1/2000

* cited by examiner

Primary Examiner—G. Bradley Bennett
(74) Attorney, Agent, or Firm—Brinks Hofer Gilson & Lione (57) ABSTRACT

The present invention provides an absolute angle detecting device capable of achieving a resolution of 1.5 degrees or less by which 360 degrees can be divided without a remainder, using two code pattern rows and eight detecting elements. The absolute angle detecting device comprises a rotary disk 1; a first code pattern row 2 and a second code pattern row 3, each provided on the circumference whose center is the center of rotation O of the rotary disk 1; a first detecting element group 10 consisting of five detecting elements 4 to 8 that are arranged at equal intervals opposite to the first code pattern row 2; and a second detecting element group 14 consisting of three detecting elements 11 to 13 that are arranged at equal intervals opposite to the second code pattern row 3. Both a gray code obtained by combining five codes supplied from the first detecting element group 10 and a gray code obtained by combining three codes supplied from the second detecting element group 14 are cyclic codes.

19 Claims, 6 Drawing Sheets

ABSOLUTE ANGLE DETECTING DEVICE

This application claims the benefit of priority to Japanese Patent Application Nos. 2003-204661 and 2003-204663, herein incorporated by reference.

BACKGROUND OF THE INVENTION

1. Field of the Invention

The present invention relates to an absolute angle detecting device, and more specifically, to the configuration of code pattern rows formed on a rotary disk and to the arrangement of detecting devices disposed opposite to the code pattern rows.

2. Description of the Related Art

An absolute angle detecting device is conventionally provided between a steering shaft and a body of an automobile. In general, the control of the damping force of a suspension, the control of the shift position of an automatic transmission, the steering control of rear wheels in a four-wheeled vehicle, etc., are all performed based on the steering angle, the steering speed, and the steering direction of a steering wheel detected by the absolute angle detecting device. In addition, the steering shaft is a multi-revolution body that makes two or three revolutions from a neutral position to the right or left direction. Therefore, an absolute angle detecting device is required for detecting the steering angle of the steering shaft.

As devices for detecting an absolute angle with a predetermined resolution, devices using a BCD code, devices using an M-system code, devices using a gray code, etc., have been used. Specifically, the devices using the gray code have been used more often. The reason is that, since the gray code is always changed by only one bit in each step, timing pulses are not required for reading, thereby achieving high resolution.

In an absolute angle detecting device for an automobile, in general, an angle (±720 degrees to ±1080 degrees) in which the steering shaft can move is divided into predetermined angles, which are called sectors, and a gray code is assigned with a predetermined resolution in each sector. The angle of one sector is determined according to the number of output bits or the accuracy of sector detection. However, one sector is generally set to 360 degrees or 180 degrees.

In addition, the absolute angle detecting device for an automobile controls security devices, such as a suspension and wheels. Therefore, it is necessary that the absolute angle detecting device have a high resolution of between 0.5 and 2 degrees in order to achieve high-precision control.

For this kind of absolute angle detecting device, the following devices have been suggested: a device in which one code pattern row is formed on a rotary disk, where nine detecting elements are arranged opposite to the code pattern row, and a resolution of 2 degrees is achieved; a device in which three code pattern rows are formed on a rotary disk, where the all of nine detecting elements are arranged opposite to the three code pattern rows, and a resolution of 1.125 degrees is achieved; a device in which two code pattern rows are formed on a rotary disk, where the all of ten detecting elements are arranged opposite to the two code pattern rows, and a resolution of 0.9 degrees is achieved. (for example, see Japanese Unexamined Patent Application Publication No. 2000-28396 (FIGS. 1 to 4). In all of the above devices there is one sector set to 360 degrees.

However, in the absolute angle detecting device for an automobile, it is strongly required that resolution have a value that can be easily divided, such as 1.5 degrees, 1.0 degrees, or 0.5 degrees, in order to easily handle signals detected by various control devices, in addition to achieving high resolution. Furthermore, the number of code pattern rows formed on a rotary disk and the number of detecting elements arranged opposite to the code pattern rows have an effect on the size and manufacturing costs of the absolute angle detecting device. Therefore, it is preferable that the number of code pattern rows and the number of detecting elements be small.

However, the conventional absolute angle detecting device does not meet the above-mentioned requirements. In addition, when one code pattern row is used as in the conventional technique, it is impossible to achieve a resolution of 1.5 degrees, 1.0 degrees, or 0.5 degrees in the detection of an absolute angle by 8-bit gray codes. Further, when one code pattern row is used as in the conventional technique, it is impossible to achieve a resolution of 1.5 degrees in the detection of an absolute angle by 9-bit gray codes.

SUMMARY OF THE INVENTION

Accordingly, the present invention is designed to solve the above problems, and it is an object of the present invention to provide an absolute angle detecting device having two code pattern rows, and a resolution of 1.5 degrees or less by which 360 degrees can be divided without a remainder.

In addition, it is another object of the present invention to provide an absolute angle detecting device having two code pattern rows, eight or nine detecting elements, and a resolution of 1.5 degrees or less by which 360 degrees can be divided without a remainder.

In order to achieve the above objects, a first aspect of the present invention provides an absolute angle detecting device comprising: a rotary disk being rotatably supported; a first code pattern row and a second code pattern row, each provided on the circumference whose center is the center of rotation of the rotary disk; a first detecting element group consisting of a plurality of detecting elements that is arranged at equal intervals opposite to the first code pattern row; a second detecting element group consisting of a plurality of detecting elements that is arranged at equal intervals opposite to the second code pattern row; and converting means for respectively converting a plurality of codes supplied from the first detecting element group and a plurality of codes supplied from the second detecting element group into rotation angles for the rotary disk. Both a gray code obtained by combining the plurality of codes supplied from the first detecting element group and a gray code obtained by combining the plurality of codes supplied from the second detecting element group are a cyclic code in which the digit place is moved one by one whenever the rotary disk is rotated by a unit angle that is set with respect to the first code pattern row or the second code pattern row.

In this way, since the gray code obtained by combining the plurality of codes supplied from each of the first and second detecting element groups is a cyclic code, it is possible to achieve an absolute angle detecting device having two code pattern rows, and a resolution of 1.5 degrees or less by which 360 degrees can be divided without a remainder.

In the absolute angle detecting device according to the first aspect of the present invention having the total number of detecting elements constituting the first detecting element group and the number of detecting elements constituting the second detecting element group is eight.

In this way, it is possible to achieve an absolute angle detecting device having two code pattern rows, eight detecting elements, and a resolution of 1.5 degrees or less by which 360 degrees can be divided without a remainder.

In the absolute angle detecting device according to the first aspect of the present invention having the above structure, the first detecting element group consists of five detecting elements, and the second detecting element group consists of three detecting elements. A gray code obtained by combining five codes supplied from the first detecting element group is composed of a six-step cyclic code obtained by combining six code strings of 5 bits each.

As such, when the eight detecting elements are assigned to the detecting element groups and the gray code obtained by combining the codes supplied from the detecting element group that is arranged opposite to the 5-bit code pattern row is the six-step cyclic code, it is possible to achieve an absolute angle detecting device having two code pattern rows, eight detecting elements, and a resolution of 1.5 degrees or less by which 360 degrees can be divided without a remainder.

Furthermore, in the absolute angle detecting device according to the first aspect of the present invention having the above structure, the five detecting elements constituting the first detecting element group are arranged opposite to the first code pattern row at pitches that are obtained by dividing an angle forming one sector by 5, and the three detecting elements constituting the second detecting element group are arranged opposite to the second code pattern row at pitches that are obtained by dividing the angle forming the one sector by 3. In the gray code obtained by combining the five codes supplied from the first detecting element group, a digit place is moved one by one whenever the rotary disk is rotated by an angle obtained by dividing the angle forming the one sector by 5, which is the number of detecting elements constituting the first detecting element group, and by dividing the divided angle by a predetermined angle of resolution. In addition, in a code string obtained by combining the three codes supplied from the second detecting element group, the digit place is moved one by one whenever the rotary disk is rotated by an angle obtained by dividing the angle forming the one sector by 3, which is the number of detecting elements constituting the second detecting element group, and by dividing the divided angle by a predetermined angle of resolution.

In this way, it is possible to achieve an absolute angle detecting device having two cyclic code pattern rows, eight detecting elements, and a resolution of 1.5 degrees or less by which 360 degrees can be divided without a remainder.

Further, in the absolute angle detecting device according to the first aspect of the present invention having the above structure, the one sector is set to 180 degrees. The five detecting elements constituting the first detecting element group are arranged at pitches of 36 degrees, and the three detecting elements constituting the second detecting element group are arranged at pitches of 60 degrees. In the gray code obtained by combining the five codes supplied from the first detecting element group, the digit place is moved one by one whenever the rotary disk is rotated by 36 degrees corresponding to 24 steps. In addition, in the code string obtained by combining the three codes supplied from the second detecting element group, the digit place is moved one by one whenever the rotary disk is rotated by 60 degrees corresponding to 40 steps.

According to the absolute angle detecting device having the above structure, it is possible to achieve the absolute angle detecting device having two cyclic code pattern rows within one sector of 180 degrees, eight detecting elements, and a resolution of 1.5 degrees and less by which 360 degrees can be divided without a remainder.

Moreover, in the absolute angle detecting device according to the first aspect of the present invention having the above structure, the 3-bit code strings obtained by combining the three codes supplied from the second detecting element group are set to be changed one bit by one bit whenever the same code strings are repeated in the 5-bit code strings obtained by combining the five codes supplied from the first detecting element group, and the same 3-bit code strings are repeated whenever the 5-bit code strings are changed by one bit. In addition, the digit place of the 3-bit code string is moved one by one whenever the 3-bit code strings are moved by 40 steps.

According to the absolute angle detecting device having the above structure, it is possible to secure the circulation of two code pattern rows even if the same code strings of 5 bits are repeated, and also to achieve a resolution of 1.5 degrees or less by which 360 degrees can be divided without a remainder using eight detecting elements.

Further, in the absolute angle detecting device according to the first aspect of the present invention having the above structure, the 8-bit code strings, consisting of the 5-bit code strings and the 3-bit code strings, are assigned to detect the absolute angle of a sector having an angle corresponding to a divisor of 360 degrees, such as 180 degrees, 120 degrees, 90 degrees, 72 degrees, or 60 degrees.

As described above, when one sector is set to a divisor of 360 degrees, it is possible to achieve a resolution of 1.5 degrees or less by which 360 degrees can be divided without a remainder using two code pattern rows and eight detecting elements. For example, when one sector is set to 180 degrees, 120 degrees, 90 degrees, 72 degrees, or 60 degrees, the resolution is respectively, 1.5 degrees, 1.0 degrees, 0.75 degrees, 0.6 degrees, or 0.5 degrees.

Furthermore, in the absolute angle detecting device according to the first aspect of the present invention having the above structure, the combination of the six code strings of 5 bits each is obtained by combining (10000), (10100), (11100), (11110), (11010), and (11000).

Since the same codes are not found in the six code strings of 5 bits even when read from any digit place, it is possible to create a cyclic code by combining the six code strings of 5 bits each.

Furthermore, in the absolute angle detecting device according to the first aspect of the present invention having the above structure, let the six code strings of 5 bits be A, B, C, D, E, and F, respectively, and the number of repetitions of the six code strings A, B, C, D, E, and F of 5 bits be $n_A$, $n_B$, $n_C$, $n_D$, $n_E$, and $n_F$, respectively, the six code strings A, B, C, D, E, and F of 5 bits are respectively repeated a predetermined number of times to satisfy $n_A+n_B+n_C+n_D+n_E+n_F=24$.

When the resolution is 1.5 degrees, the code strings corresponding to 9 degrees, which are equivalent to six steps, are created by combining the six code strings of 5 bits. In this case, the 5-bit code strings corresponding to 27 degrees, which are equivalent to 18 steps, are short. Therefore, it is necessary to repeat the six code strings of 5 bits to create the combination of 5-bit code strings corresponding to 24 steps.

Moreover, in the absolute angle detecting device according to the first aspect of the present invention having the above structure, let the six code strings of 5 bits be A, B, C, D, E, and F, respectively, and the number of repetitions of those six code strings A, B, C, D, E, and F of 5 bits be $n_A$, $n_B$, $n_C$, $n_D$, $n_E$, and $n_F$, respectively, $n_A=n_B=n_C=n_D=n_E=n_F=4$.

In order that the number of repetitions $n_A$, $n_B$, $n_C$, $n_D$, $n_E$, and $n_F$ of the six code strings A, B, C, D, E, and F of 5 bits satisfies $n_A+n_B+n_C+n_D+n_E+n_F=24$, the following relationship can be established: $n_A=n_D=5$, $n_B=n_E=4$, $n_C=n_F=3$; $n_A=n_D=7$, $n_B=n_E=4$, $n_C=n_F=1$; or $n_A=n_B=5$, $n_C=n_D=4$, $n_E=n_F=3$. In consideration of the failsafe when one of the detecting elements arranged opposite to the 5-bit code pattern row is damaged, it is preferable that the number of repetitions of the respective code strings be equal to or approximate to each other as much as possible and the maximum number of repetitions be small. Furthermore, in the case of the last combination of the number of repetitions, that is, $n_A=n_B=5$, $n_C=n_D=4$, $n_E=n_F=3$, it is impossible to clear a restriction that gray code strings must consist of 8-bit code strings as a whole since the 5-bit code strings are a cyclic code in which the digit place is moved one by one every 36 degrees and the digit place is moved one by one every 40 steps in the 3-bit code strings. Therefore, the last combination of the number of repetitions cannot be adopted. From this point of view, when the number of repetitions $n_A$, $n_B$, $n_C$, $n_D$, $n_E$, and $n_F$ of the six code strings A, B, C, D, E, and F of 5 bits satisfies $n_A=n_B=n_C=n_D=n_E=n_F=4$, the above-mentioned restriction can be completely cleared. Even when one of the detecting elements arranged opposite to the 5-bit code pattern row is damaged, errors can be sensed at the maximum angle of 6 degrees (=1.5 degrees×4). Therefore, an absolute angle detecting device can be operated with high stability and reliability at the time of a failure.

In order to achieve the above objects, a second aspect of the present invention provides an absolute angle detecting device comprising: a rotary disk being rotatably supported; a first code pattern row and a second code pattern row, each provided on the circumference whose center is the center of rotation of the rotary disk; a first detecting element group consisting of a plurality of detecting elements that is arranged at equal intervals opposite to the first code pattern row; a second detecting element group consisting of a plurality of detecting elements that is arranged at equal intervals opposite to the second cbde pattern row; and converting means for respectively converting a plurality of codes supplied from the first detecting element group and a plurality of codes supplied from the second detecting element group into rotation angles for the rotary disk. The total number of detecting elements constituting the first detecting element group and the number of detecting elements constituting the second detecting element group is nine. Both a gray code obtained by combining the plurality of codes supplied from the first detecting element group and a gray code obtained by combining the plurality of codes supplied from the second detecting element group are a cyclic code in which a digit place is moved one by one whenever the rotary disk is rotated by a unit angle that is set with respect to the first code pattern row or the second code pattern row.

As such, since the gray code obtained by combining the plurality of codes supplied from each of the first and second detecting element groups is a cyclic code, it is possible to achieve an absolute angle detecting device having two code pattern rows, nine detecting elements, and a resolution of 1.5 degrees or less by which 360 degrees can be divided without a remainder.

Further, in the absolute angle detecting device according to the second aspect of the present invention, the first detecting element group consists of six detecting elements, and the second detecting element group consists of three detecting elements. A gray code obtained by combining six codes supplied from the first detecting element group is composed of an eight-step cyclic code obtained by combining eight code strings of 6 bits each.

As such, when the nine detecting elements are assigned to the detecting element groups and the gray code obtained by combining the codes supplied from the detecting element group that is arranged opposite to the 6-bit code pattern row is the eight-step cyclic code, it is possible to achieve an absolute angle detecting device having two code pattern rows, nine detecting elements, and a resolution of 1.5 degrees or less by which 360 degrees can be divided without a remainder.

Furthermore, in the absolute angle detecting device according to the second aspect of the present invention, the six detecting elements constituting the first detecting element group are arranged opposite to the first code pattern row at pitches that are obtained by dividing an angle forming one sector by 6, and the three detecting elements constituting the second detecting element group are arranged opposite to the second code pattern row at pitches that are obtained by dividing the angle forming the one sector by 3. In the gray code obtained by combining the six codes supplied from the first detecting element group, the digit place is moved one by one whenever the rotary disk is rotated by an angle obtained by dividing the angle forming the one sector by 6, which is the number of detecting elements constituting the first detecting element group, and by dividing the divided angle by a predetermined angle of resolution. In addition, in a code string obtained by combining the three codes supplied from the second detecting element group, the digit place is moved one by one whenever the rotary disk is rotated by an angle obtained by dividing the angle forming the one sector by 3, which is the number of detecting elements constituting the second detecting element group, and by dividing the divided angle by a predetermined angle of resolution.

In this way, it is possible to achieve an absolute angle detecting device having two cyclic code pattern rows, nine detecting elements, and a resolution of 1.5 degrees or less by which 360 degrees can be divided without a remainder.

Further, in the absolute angle detecting device according to the second aspect of the present invention having the above structure, the one sector is set to 180 degrees. The six detecting elements constituting the first detecting element group are arranged at pitches of 30 degrees, and the three detecting elements constituting the second detecting element group are arranged at pitches of 60 degrees. In the gray code obtained by combining the six codes supplied from the first detecting element group, the digit-place is moved one by one whenever the rotary disk is rotated by 30 degrees corresponding to 20 steps. In addition, in the code string obtained by combining the three codes supplied from the second detecting element group, the digit place is moved one by one whenever the rotary disk is rotated by 60 degrees corresponding to 40 steps.

According to the absolute angle detecting device having the above structure, it is possible to achieve two cyclic code pattern rows within one sector of 180 degrees, and also to achieve a resolution of 1.5 degrees or less by which 360 degrees can be divided without a remainder using nine detecting elements.

Moreover, in the absolute angle detecting device according to the second aspect of the present invention having the above structure, the 3-bit code strings obtained by combining the three codes supplied from the second detecting element group are set to be changed one bit by one bit whenever the same code strings are repeated in the 6-bit code strings obtained by combining the six codes supplied from the first detecting element group, and the same 3-bit code strings are repeated whenever the 6-bit code strings are changed by one bit. In addition, the digit place of the 3-bit code strings is moved one by one whenever the 3-bit code strings are moved by 40 steps.

According to the absolute angle detecting device having the above structure, it is possible to secure the circulation of two code pattern rows even if the same code strings of 6 bits are repeated, and also to achieve a resolution of 1.5 degrees or less by which 360 degrees can be divided with a remainder using nine detecting elements.

Further, in the absolute angle detecting device according to the second aspect of the present invention having the above structure, the 9-bit code strings consisting of the 6-bit code strings and the 3-bit code strings are assigned to detect the absolute angle of a sector having an angle corresponding to a divisor of 360 degrees, such as 180 degrees, 120 degrees, 90 degrees, 72 degrees, or 60 degrees.

As described above, when one sector is set to a divisor of 360 degrees, it is possible to achieve a resolution of 1.5 degrees or less by which 360 degrees can be divided without a remainder using two code pattern rows and nine detecting elements. For example, when one sector is set to 180 degrees, 120 degrees, 90 degrees, 72 degrees, or 60 degrees, the resolution is respectively, 1.5 degrees, 1.0 degrees, 0.75 degrees, 0.6 degrees, or 0.5 degrees.

Furthermore, in the absolute angle detecting device according to the second aspect of the present invention having the above structure, the combination of the eight code strings of 6 bits each is obtained by combining eight code strings of 6 bits selected from (100000), (110000), (101000), (111000), (110100), (101100), (111100), (111010), and (111110).

Since the same codes are not found in the nine code strings of 6 bits even when read from any digit place, it is possible to create a cyclic code by combining the eight code strings of 6 bits selected from the nine code strings of 6 bits.

Furthermore, in the absolute angle detecting device according to the second aspect of the present invention having the above structure, let the eight code strings of 6 bits be A, B, C, D, E, F, G, and H, respectively, and the number of repetitions of the eight code strings A, B, C, D, E, F, G, and H of 6 bits be $n_A$, $n_B$, $n_C$, $n_D$, $n_E$, $n_F$, $n_G$, and $n_H$, respectively, the eight code strings A, B, C, D, E, F, G, and H of 6 bits are respectively repeated a predetermined number of times to satisfy $n_A+n_B+n_C+n_D+n_E+n_F+n_G+n_H=20$.

When the resolution is 1.5 degrees, by combining the eight code strings of 6 bits, the code strings corresponding to 12 degrees, which are equivalent to eight steps, are created. In this case, the 6-bit code strings corresponding to 18 degrees, which are equivalent to 12 steps, are short. Therefore, it is necessary to repeat the eight code strings of 6 bits to create the combination of 6-bit code strings corresponding to 20 steps.

Moreover, in the absolute angle detecting device according to second aspect of the present invention having the above structure, let the eight code strings of 6-bits be A, B, C, D, E, F, G, and H, respectively, and the number of repetitions of the eight code strings A, B, C, D, E, F, G, and H of 6 bits be $n_A$, $n_B$, $n_C$, $n_D$, $n_E$, $n_F$, $n_G$, and $n_H$, respectively. The following relationship is established: $n_A+n_B+n_C+n_D+n_E+n_F+n_G+n_H=20$, where $n_A$ to $n_H$ each have a value of 2 or 3.

In order that the number of repetitions $n_A$, $n_B$, $n_C$, $n_D$, $n_E$, $n_F$, $n_G$, and $n_H$ of the eight code strings A, B, C, D, E, F, G, and H of 6 bits satisfies $n_A+n_B+n_C+n_D+n_E+n_F+n_G+n_H=20$, the following relationship can be established: $n_A=n_C=n_E=n_G=4$, $n_B=n_D=n_F=n_H=1$; $n_A=n_C=n_E=n_G=3$, $n_B=n_D=n_F=n_H=2$; or $n_A=n_E=5$, $n_B=n_C=n_F=n_G=2$, $n_D=n_H=1$.

In consideration of the failsafe when one of the detecting elements arranged opposite to the 6-bit code pattern row is damaged, the number of repetitions of the respective code strings is preferably equal to or approximate to each other as much as possible so that the maximum number of repetitions is small. Therefore, in the case of $n_A=n_C=n_E=n_G=3$ and $n_B=n_D=n_F=n_H=2$, errors can be sensed at the maximum angle of 4.5 degrees (=1.5 degrees×3) even when one of the detecting elements arranged opposite to the 6-bit code pattern row is damaged. Consequently, an absolute angle detecting device can be operated with high stability and reliability at the time of a failure.

Furthermore, in the absolute angle detecting device according to the second aspect of the present invention having the above structure, the 3-bit code string obtained by combining the three codes supplied from the second detecting element group is formed such that the digit place is changed one bit by one bit whenever the same code strings are repeated in the 6-bit code strings obtained by combining the six codes supplied from the first detecting element group.

In this way, when the 3-bit code string is changed by one bit at positions where the same code strings are repeated in the 6-bit code strings, the digit place of 9-bit code string can be moved as a whole only by repeating the 6-bit code string. Therefore, it is possible to achieve a resolution of 1.5 degrees or less within one sector.

BRIEF DESCRIPTION OF THE DRAWINGS

FIG. 2 is a table illustrating an example of a gray code pattern of the absolute angle detecting device according to the first embodiment of the present invention;

DETAILED DESCRIPTION OF THE EMBODIMENTS

Figure 1:
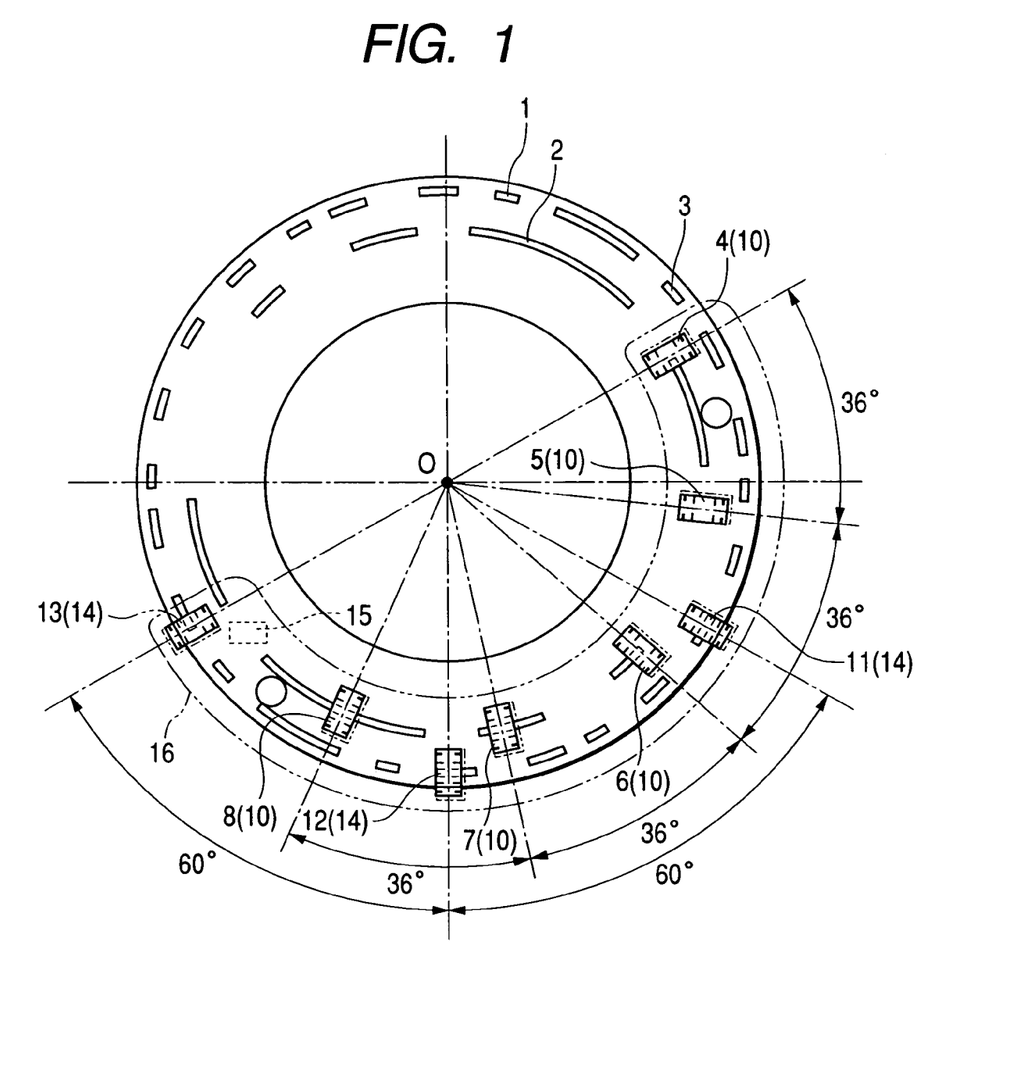
FIG. 1 is a view illustrating the structure of an absolute angle detecting device according to a first embodiment of the present invention.
Figure 3:
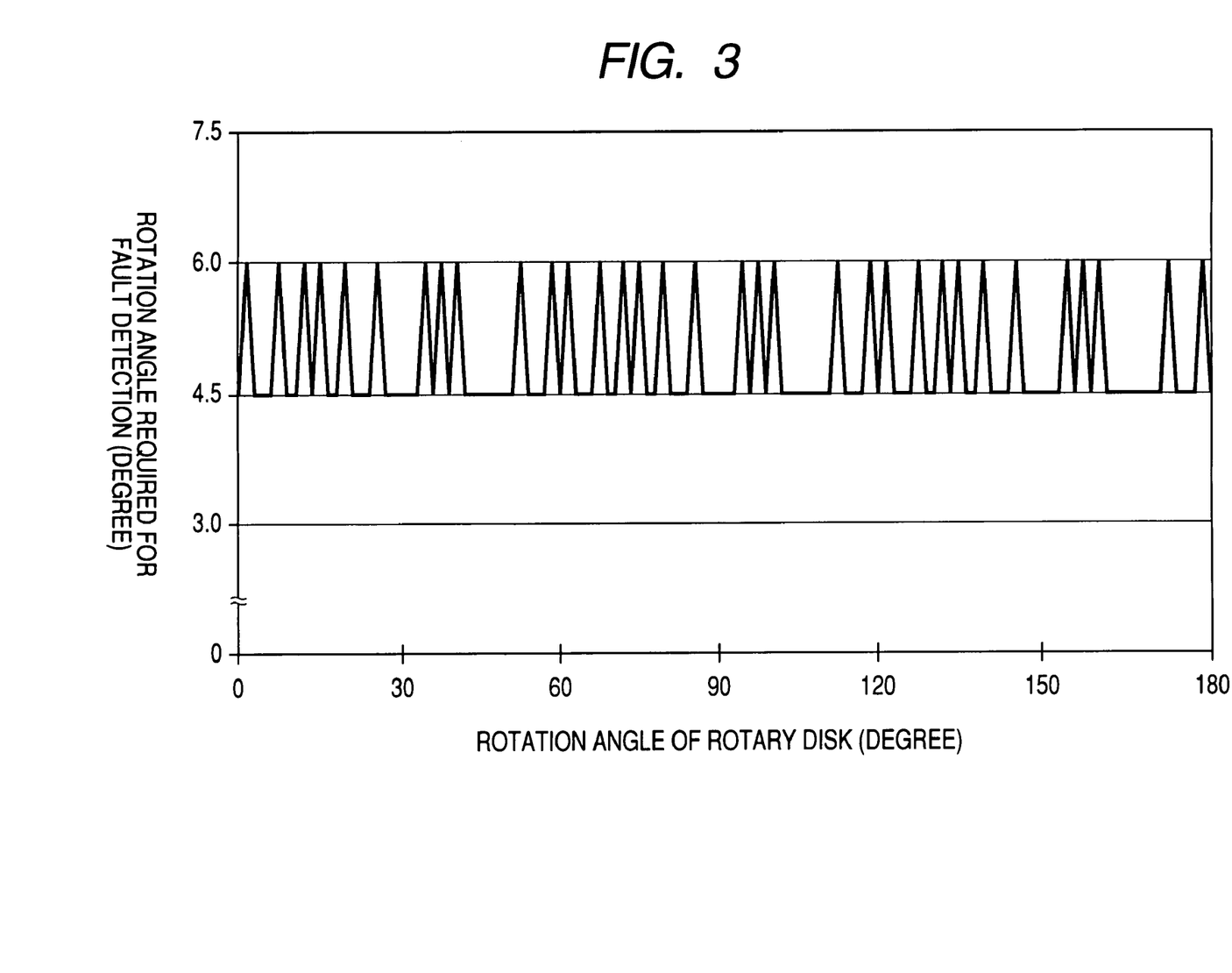
FIG. 3 is a graph illustrating a fail-safe characteristic of the absolute angle detecting device according to the first embodiment of the present invention.

Hereinafter, absolute angle detecting devices according to the first and second embodiments of the present invention will be described with reference to FIGS. 1 to 6. FIG. 1 is a view illustrating the structure of an absolute angle detecting device according to the first embodiment of the present invention. FIG. 2 is a table showing an example of a gray code pattern of the absolute angle detecting device according to the first embodiment of the present invention. FIG. 3 is a graph showing a fail-safe characteristic of the absolute angle detecting device according to the first embodiment of the present invention.

As shown in FIG. 1, the absolute angle detecting device according to the first embodiment of the present invention comprises a rotary disk 1, a first code pattern row 2 and a second code pattern row 3, each provided on the circumference whose center is the center of rotation O of the rotary disk 1 with its one sector being 180 degrees, a first detecting element group 10 consisting of five detecting elements 4, 5, 6, 7, and 8 that are arranged at equal intervals opposite to the first code pattern row 2, a second detecting element group 14 consisting of three detecting elements 11, 12, and 13 that are arranged at equal intervals opposite to the second code pattern row 3, converting means 15 for respectively converting five codes supplied from the first detecting element group 10 and three codes supplied from the second detecting element group 14 into rotation angles for the rotary disk 1, and a circuit board 16 on which the respective detecting elements 4 to 8 and 11 to 13, and the converting means 15 are mounted.

The first code pattern row 2 and the second code pattern row 3 are formed of an optical pattern, such as a transparent hole or a cut-out portion, a magnetic pattern, or a resistor pattern, respectively. The detecting elements 4 to 8 and 11 to 13 are selected according to the configuration of the code pattern rows 2 and 3. That is, when the code pattern rows 2 and 3 are composed of an optical pattern, respectively, photo-interrupters are used as the detecting elements 4 to 8 and 11 to 13. When the code pattern rows 2 and 3 are composed of a magnetic pattern, respectively, magnetic detecting elements are used. When the code pattern rows 2 and 3 are composed of a resistor pattern, respectively, collecting brushes are used.

The converting means 15 converts the codes detected by the respective detecting elements 4 to 8 and 11 to 13 into rotation angles for the rotary disk 1 and comprises semiconductor integrated circuits and the like.

The five detecting elements 4 to 8 constituting the first detecting element group 10 are arranged at pitches of 36 degrees opposite to the first code pattern row 2, and the three detecting elements 11 to 13 constituting the second detecting element group 14 are arranged at pitches of 60 degrees opposite to the second code pattern row 3.

The first code pattern row 2 is composed of a six-step cyclic code obtained by combining six code strings each consisting of 5 bits, that is, (10000), (10100), (11100), (11110), (11010), and (11000), in which the same codes are not found even when read from any digit place.

In addition, when resolution is 1.5 degrees, code strings corresponding to only 9 degrees are created by combining the six code strings of 5 bits. In this case, 5-bit code strings corresponding to 27 degrees (18 steps) are short. Therefore, let the six-step code strings of 5 bits be A, B, C, D, E, and F, respectively, and the number of repetitions of the six-step code strings A, B, C, D, E, and F of 5 bits be $n_A$, $n_B$, $n_C$, $n_D$, $n_E$, and $n_F$, respectively, the six code strings A, B, C, D, E, and F of 5 bits are respectively repeated a predetermined number of times to satisfy $n_A+n_B+n_C+n_D+n_E+n_F=24$, resulting in the creation of code strings corresponding to 36 degrees (24 steps). In gray code obtained by combining the five codes supplied from the first detecting element group 10, the digit place is moved one by one whenever the rotary disk 1 is rotated by 36 degrees.

In order that the number of repetitions $n_A$, $n_B$, $n_C$, $n_D$, $n_E$, and $n_F$ of the six code strings A, B, C, D, E, and F of 5 bits satisfies the relationship $n_A+n_B+n_C+n_D+n_E+n_F=24$, the following relationship can be established: $n_A=n_B=n_C=n_D=n_E=n_F=4$; $n_A=n_D=5$, $n_B=n_E=4$, $n_C=n_F=3$; $n_A=n_D=7$, $n_B=n_E=4$, $n_C=n_F=1$; or $n_A=n_B=5$, $n_C=n_D=4$, $n_E=n_F=3$. In consideration of the failsafe when one of the detecting elements arranged opposite to the 5-bit code pattern row is damaged, the number of repetitions of the respective code strings is preferably equal to or approximate to each other as much as possible. Furthermore, in the case of the last combination of the number of repetitions, that is, $n_A=n_B=5$, $n_C=n_D=4$, and $n_E=n_F=3$, it is impossible to clear a restriction that gray code strings must consist of 8-bit code strings as a whole since the 5-bit code strings are a cyclic code in which the digit place is moved one by one every 36 degrees and the digit place is moved one by one every 40 steps in the 3-bit code strings. Therefore, the last combination of the number of repetitions cannot be adopted. From this point of view, $n_A=n_B=n_C=n_D=n_E=n_F=4$ is more preferable. In this case, as shown in FIG. 3, since errors can be sensed at the maximum angle of 6 degrees (=1.5 degrees×4) within one sector, an absolute angle detecting device can be operated with high stability and reliability at the time of a failure.

The second code pattern row 3 is formed such that the digit place of the 3-bit code strings obtained by combining the three codes supplied from the second detecting element group 14 are moved one bit by one bit whenever the same code strings are repeated in the 5-bit code strings obtained by combining the five codes supplied from the first detecting element group 10, or such that the digit place of the 3-bit code string is moved one by one whenever the rotary disk 1 is rotated by 60 degrees (40 steps). In this way, it is possible to achieve 8-bit gray codes as a whole only by repeating the 5-bit code strings, and thus to maintain a resolution of 1.5 degrees over one sector.

FIG. 2 shows an example of a gray code pattern corresponding to one sector of the absolute angle detecting device according to the first embodiment of the present invention. In FIG. 2, signal C(n) to signal C(n+4) represent codes respectively detected by the five detecting elements 4 to 8 that constitute the first detecting element group 10, and signal D(n) to signal D(n+2) represent codes respectively detected by the three detecting elements 11 to 13 that constitute the second detecting element group 14. As can be apparently seen from the table shown in FIG. 2, in the absolute angle detecting device according to the first embodiment of the present invention, both the gray code obtained by combining the five codes supplied from the first detecting element group 10 and the gray code obtained by combining the three codes supplied from the second detecting element group 14 are composed of a cyclic code with a resolution of 1.5 degrees.

In addition, according to the first embodiment of the present invention, although one sector is 180 degrees, one sector may be 120 degrees, 90 degrees, 72 degrees, or 60 degrees. In this case, the resolution corresponding thereto can be 1.0 degrees, 0.75 degrees, 0.6 degrees, or 0.5 degrees, which can be easily handled and divided.

Furthermore, according to the first embodiment of the present invention, the detection of an absolute angle is performed on one sector of 180 degrees. However, it is possible to detect an absolute angle of 360 degrees or less using necessary sector detecting means. In addition, it is also possible to detect an absolute angle more than 360 degrees using a necessary decelerating mechanism provided between a rotating body and the rotary disk.

Figure 4:
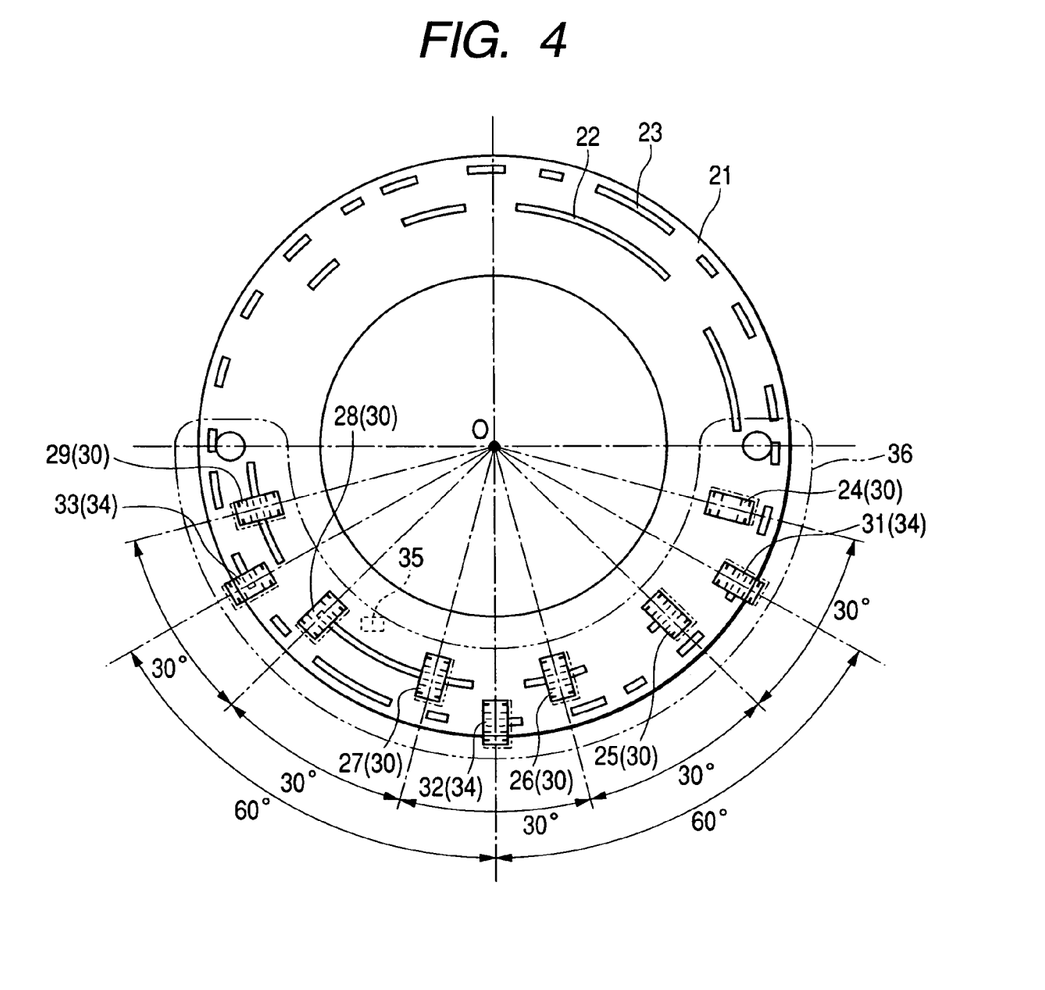
FIG. 4 is a view illustrating the structure of an absolute angle detecting device according to a second embodiment of the present invention.
Figure 5:
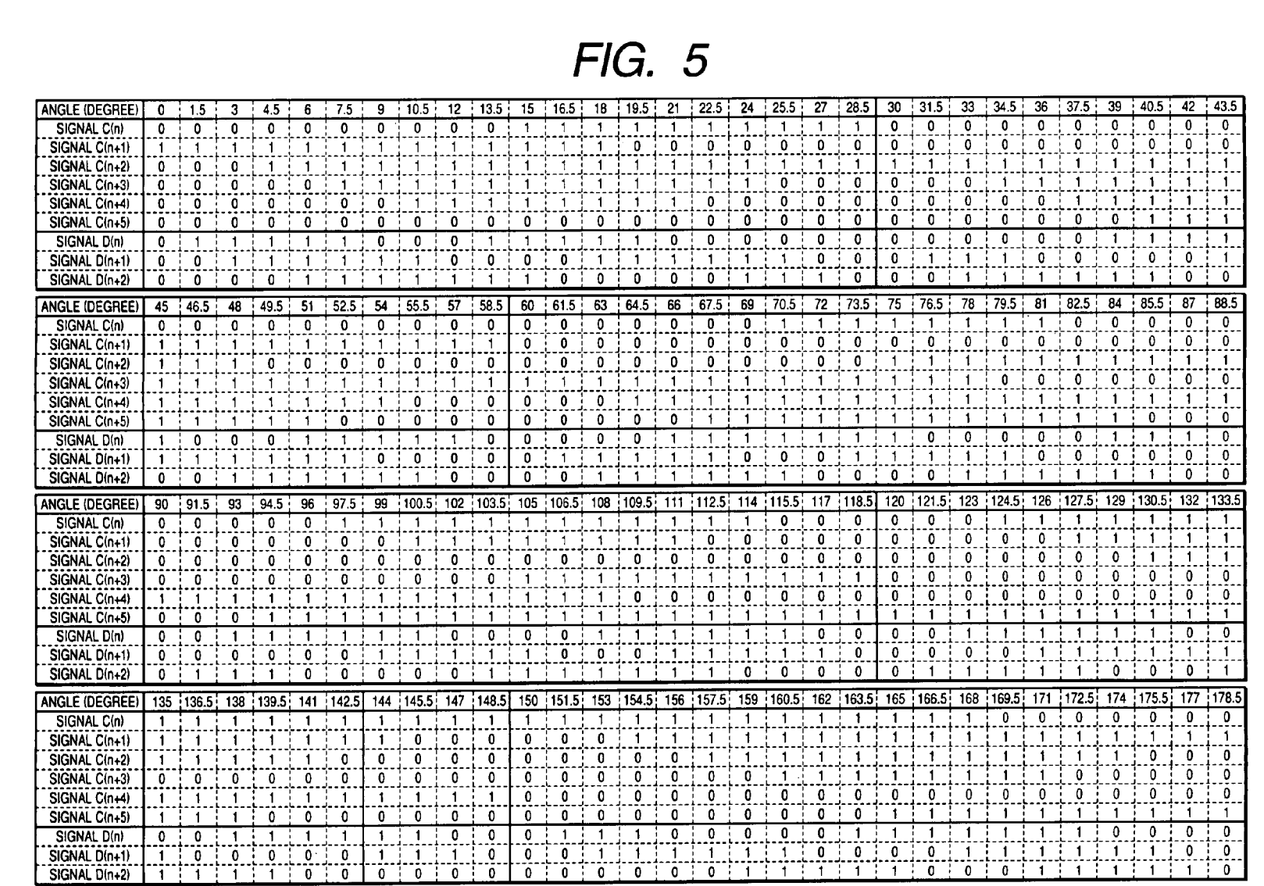
FIG. 5 is a table illustrating an example of a gray code pattern of the absolute angle detecting device according to the second embodiment of the present invention.

An absolute angle detecting device according to the second embodiment of the present invention will now be described with reference to FIGS. 4 to 6. FIG. 4 is a view illustrating the structure of the absolute angle detecting device according to the second embodiment. FIG. 5 is a table showing an example of a gray code pattern of the absolute angle detecting device according to the second embodiment.

Figure 6:
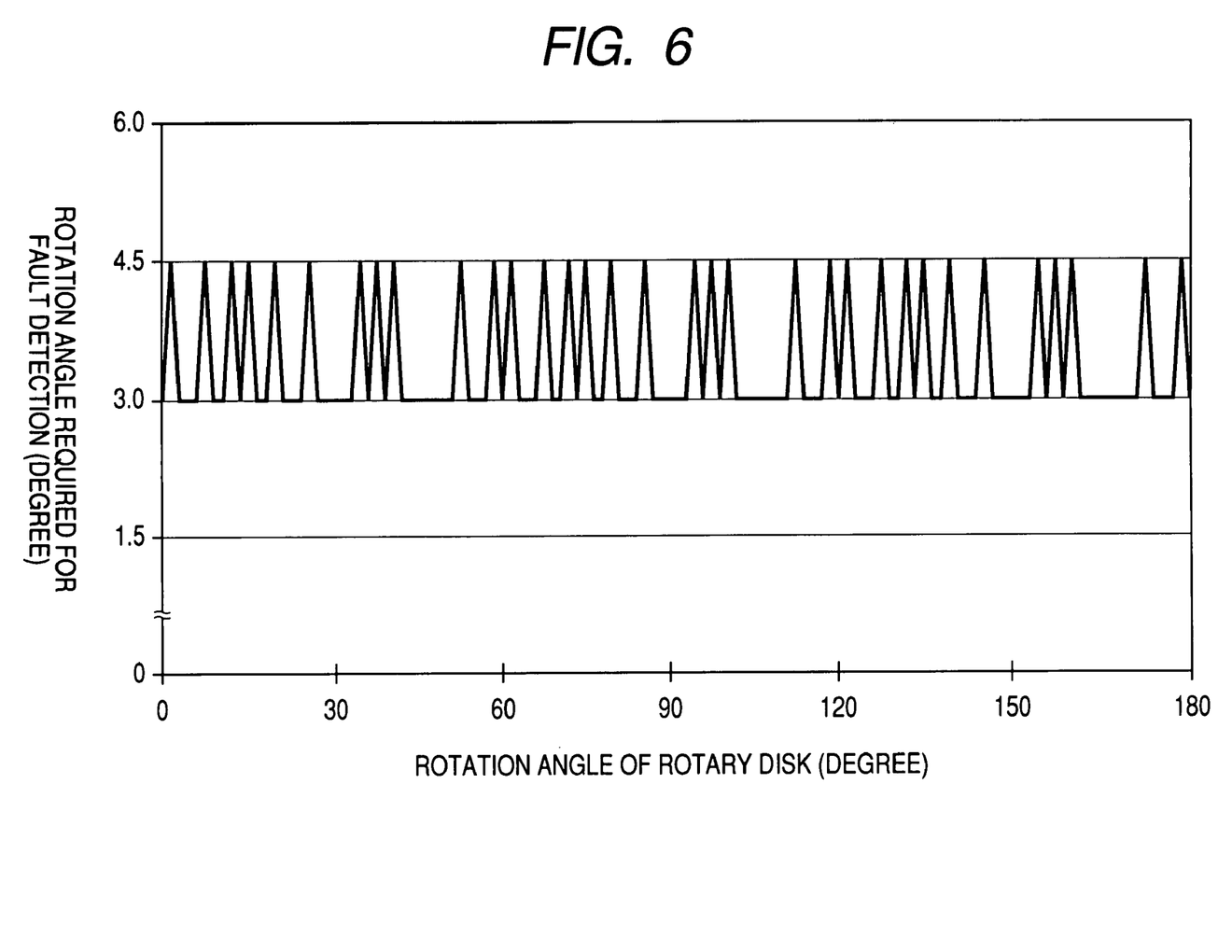
FIG. 6 is a graph illustrating a fail-safe characteristic of the absolute angle detecting device according to the second embodiment of the present invention.

FIG. 6 is a graph showing a fail-safe characteristic of the absolute angle detecting device according to the second embodiment.

As shown in FIG. 4, the absolute angle detecting device according to the second embodiment of the present invention comprises a rotary disk 21, a first code pattern row 22 and a second code pattern row 23, each provided on the circumference whose center is the center of rotation O of the rotary disk 21 with its one sector being 180 degrees, a first detecting element group 30 consisting of six detecting elements 24, 25, 26, 27, 28, and 29 that are arranged at equal intervals opposite to the first code pattern row 22, a second detecting element group 34 consisting of three detecting elements 31, 32, and 33 that are arranged at equal intervals to be opposite to the second code pattern row 23, converting means 35 for respectively converting six codes supplied from the first detecting element group 30 and three codes supplied from the second detecting element group 34 into rotation angles for the rotary disk 21, and a circuit board 36 on which the respective detecting elements 24 to 29 and 31 to 33, and the converting means 35 are mounted.

The first code pattern row 22 and the second code pattern row 23 are formed of an optical pattern, such as a transparent hole or a cut-out portion, a magnetic pattern, or a resistor pattern, respectively. The detecting elements 24 to 29 and 31 to 33 are selected according to the configuration of the code pattern rows 22 and 23. That is, when the code pattern rows 22 and 23 are composed of an optical pattern, respectively, photo-interrupters are used as the detecting elements 24 to 29 and 31 to 33. When the code pattern rows 22 and 23 are composed of a magnetic pattern, respectively, magnetic detecting elements are used. When the code pattern rows 22 and 23 are, composed of a resistor pattern, respectively, collecting brushes are used.

The converting means 35 converts the codes detected by the respective detecting elements 24 to 29 and 31 to 33 into rotation angles for the rotary disk 21 and comprises semiconductor integrated circuits and the like.

The six detecting elements 24 to 29 constituting the first detecting element group 30 are arranged at pitches of 30 degrees opposite to the first code pattern row 22, and the three detecting elements 31 to 33 constituting the second detecting element group 34 are arranged at pitches of 60 degrees opposite to the second code pattern row 23.

The first code pattern row 22 is composed of a eight-step cyclic code obtained by combining eight code strings of 6 bits selected from nine code strings of 6 bits, that is, (100000), (110000), (101000), (111000), (110100), (101100), (111100), (111010), and (111110), in which the same code is not found even when read from any digit place.

In addition, when resolution is 1.5 degrees, code strings corresponding to only 12 degrees are created by combining the eight code strings of 6 bits. In this case, 6-bit code strings corresponding to 18 degrees (12 steps) are short. Therefore, let the selected eight code strings of 6 bits be A, B, C, D, E, F, G, and. H, respectively, and the number of repetitions of the eight code strings A, B, C, D, E, F, G, and H of 6 bits be $n_A$, $n_B$, $n_C$, $n_D$, $n_E$, $n_F$, $n_G$, and $n_H$, respectively, the eight code strings A, B, C, D, E, F, G, and H of 6 bits are respectively repeated a predetermined number of times to satisfy $n_A+n_B+n_C+n_D+n_E+n_F+n_G+n_H=20$, resulting in the creation of code strings corresponding to 30 degrees (20 steps). In the gray code obtained by combining the six codes supplied from the first detecting element group 30, the digit place is moved one by one whenever the rotary disk 21 is rotated by 30 degrees.

In order that the number of repetitions $n_A$, $n_B$, $n_C$, $n_D$, $n_E$, $n_F$, $n_G$, and $n_H$ of the eight code strings A, B, C, D, E, F, G, and H of 6 bits satisfies $n_A+n_B+n_C+n_D+n_E+n_F+n_G+n_H=20$, the following relationship can be established: $n_A=n_C=n_E=n_G=4$, and $n_B=n_D=n_F=n_H=1$ or $n_A=n_C=n_E=n_G=3$, and $n_B=n_D=n_F=n_H=2$. In addition, the following relationship can be established: $n_A=n_E=5$, $n_B=n_C=n_F=n_G=2$, and $n_D=n_H=1$. In consideration of the failsafe when one of the six detecting elements 24 to 29 constituting the first detecting element group 30 is damaged, the number of repetitions of the respective code strings A, B, C, D, E, F, G, and H is preferably equal to or approximate to each other as much as possible such that the maximum number of repetitions is small. From this point of view, it is preferable that the following relationships be simultaneously established: $n_A+n_B+n_C+n_D+n_E+n_F+n_G+n_H=20$; and $n_A$, $n_B$, $n_C$, $n_D$, $n_E$, $n_F$, $n_G$, and $n_H$ each have a value of 2 or 3. In this case, as shown in FIG. 6, errors can be sensed at the maximum angle of 4.5 degrees (=1.5 degrees×3) within one sector. Therefore, an absolute angle detecting device can be operated with high stability and reliability at the time of a failure.

The second code pattern row 23 is formed such that the digit place of the 3-bit code strings obtained by combining the three codes supplied from the second detecting element group 34 are moved one bit by one bit whenever the same code strings are repeated in the 6-bit code strings obtained by combining the six codes supplied from the first detecting element group 30, or such that the digit place of the 3-bit code string is moved one bit by one bit whenever the rotary disk 21 is rotated by 60 degrees corresponding to 40 steps. In this way, it is possible to achieve 9-bit gray codes as a whole only by repeating the 6-bit code strings, and thus to maintain a resolution of 1.5 degrees over one sector.

FIG. 5 shows an example of a gray code pattern corresponding to one sector of the absolute angle detecting device according to the second embodiment of the present invention. In FIG. 5, signal C(n) to signal C(n+5) represent codes respectively detected by the six detecting elements 24 to 29 that constitute the first detecting element group 30, and signal D(n) to signal D(n+2) represent codes respectively detected by the three detecting elements 31 to 33 that constitute the second detecting element group 34. As can be apparently seen from the table shown in FIG. 5, in the absolute angle detecting device according to the second embodiment of the present invention, both the gray code obtained by combining the six codes supplied from the first detecting element group 30 and the gray code obtained by combining the three codes supplied from the second detecting element group 34 are composed of a cyclic code with a resolution of 1.5 degrees.

In addition, according to the second embodiment of the present invention, although one sector is 180 degrees, one sector may be 120 degrees, 90 degrees, 72 degrees, or 60 degrees. In this case, the resolution corresponding thereto can be 1.0 degrees, 0.75 degrees, 0.6 degrees, or 0.5 degrees, which can be easily divided and handled.

Furthermore, according to the second embodiment of the present invention, the detection of an absolute angle is performed on one sector of 180 degrees. However, it is possible to detect an absolute angle of 360 degrees or less using necessary sector detecting means. In addition, it is possible to detect an absolute angle more than 360 degrees using a necessary decelerating mechanism provided between a rotating body and a rotary disk.

What is claimed is:

1. An absolute angle detecting device, comprising:
   a rotary disk being rotatably supported;
   a first code pattern row and a second code pattern row, each provided on the circumference whose center is the center of rotation of the rotary disk;
   a first detecting element group consisting of a plurality of detecting elements that is arranged at equal intervals opposite to the first code pattern row,
   a second detecting element group consisting of a plurality of detecting elements that is arranged at equal intervals opposite to the second code pattern row, and
   converting means for respectively converting a plurality of codes supplied from the first detecting element group and a plurality of codes supplied from the second detecting element group into rotation angles for the rotary disk,
   wherein both a gray code obtained by combining the plurality of codes supplied from the first detecting element group and a gray code obtained by combining the plurality of codes supplied from the second detecting element group are a cyclic code in which a digit place is moved one by one whenever the rotary disk is rotated by a unit angle that is set with respect to the first code pattern row or the second code pattern row.

2. The absolute angle detecting device according to claim 1,
   wherein the total number of detecting elements constituting the first detecting element group and the number of detecting elements constituting the second detecting element group is eight.

3. The absolute angle detecting device according to claim 2,
   wherein the first detecting element group consists of five detecting elements, and the second detecting element group consists of three detecting elements, and
   wherein the gray code obtained by combining five codes supplied from the first detecting element group is composed of a six-step cyclic code obtained by combining six code strings of 5 bits.

4. The absolute angle detecting device according to claim 3
   wherein the five detecting elements constituting the first detecting element group are arranged opposite to the first code pattern row at pitches that are obtained by dividing an angle forming one sector by 5, and the three detecting elements constituting the second detecting element group are arranged opposite to the second code pattern row at pitches that are obtained by dividing the angle forming the one sector by 3,
   wherein, in the gray code obtained by combining the five codes supplied from the first detecting element group, the digit place is moved one by one whenever the rotary disk is rotated by an angle obtained by dividing the angle forming the one sector by 5, which is the number of detecting elements constituting the first detecting element group, and by dividing the divided angle by a predetermined angle of resolution, and
   wherein, in a code string obtained by combining the three codes supplied from the second detecting element group, the digit place is moved one by one whenever the rotary disk is rotated by an angle obtained by dividing the angle forming the one sector by 3, which is the number of detecting elements constituting the second detecting element group, and by dividing the divided angle by a predetermined angle of resolution.

5. The absolute angle detecting device according to claim 4,
   wherein the one sector is set to 180 degrees,
   wherein the five detecting elements constituting the first detecting element group are arranged at pitches of 36 degrees, and the three detecting elements constituting the second detecting element group are arranged at pitches of 60 degrees,
   wherein, in the gray code obtained by combining the five codes supplied from the first detecting element group, the digit place is moved one by one whenever the rotary disk is rotated by 36 degrees corresponding to 24 steps, and
   wherein, in the code string obtained by combining the three codes supplied from the second detecting element group, the digit place is moved one by one whenever the rotary disk is rotated by 60 degrees corresponding to 40 steps.

6. The absolute angle detecting device according to claim 3,
   wherein the 3-bit code strings obtained by combining the three codes supplied from the second detecting element group are set to be changed one bit by one bit whenever the same code strings are repeated in the 5-bit code strings obtained by combining the five codes supplied from the first detecting element group, and the same 3-bit code strings are repeated whenever the 5-bit code strings are changed by one bit, and
   wherein the digit place of the 3-bit code string is moved one by one whenever the 3-bit code strings are moved by 40 steps.

7. The absolute angle detecting device according to claim 6,
   wherein 8-bit code strings consisting of the 5-bit code strings and the 3-bit code strings are assigned to detect the absolute angle of a sector having an angle corresponding to a divisor of 360 degrees, such as 180 degrees, 120 degrees, 90 degrees, 72 degrees, or 60 degrees.

8. The absolute angle detecting device according to claim 3,
   wherein the combination of the six code strings of 5 bits is obtained by combining (10000), (10100), (11100), (11110), (11010), and (11000).

9. The absolute angle detecting device according to claim 8,
   wherein, when the six code strings of 5 bits are A, B, C, D, E, and F, respectively, and the number of repetitions of the six code strings A, B, C, D, E, and F of 5 bits is $n_A$, $n_B$, $n_C$, $n_D$, $n_E$, and $n_F$, respectively, the six code strings A, B, C, D, E, and F of 5 bits are respectively repeated a predetermined number of times to satisfy $n_A+n_B+n_C+n_D+n_E+n_F=24$.

10. The absolute angle detecting device according to claim 8,
    wherein, when the six code strings of 5 bits are A, B, C, D, E, and F, respectively, and the number of repetitions of the six code strings A, B, C, D, E, and F of 5 bits is $n_A$, $n_B$, $n_C$, $n_D$, $n_E$, and $n_F$, respectively, $n_A=n_B=n_C=n_D=n_E=n_F=4$.

11. An absolute angle detecting device according to claim 1
    wherein the total number of detecting elements constituting the first detecting element group and the number of detecting elements constituting the second detecting element group is nine.

12. The absolute angle detecting device according to claim 11,
- wherein the first detecting element group consists of six detecting elements, and the second detecting element group consists of three detecting elements, and
- wherein a gray code obtained by combining six codes supplied from the first detecting element group is composed of an eight-step cyclic code obtained by combining eight code strings of 6 bits.

13. The absolute angle detecting device according to claim 12,
- wherein the six detecting elements constituting the first detecting element group are arranged opposite to the first code pattern row at pitches that are obtained by dividing an angle forming one sector by 6, and the three detecting elements constituting the second detecting element group are arranged opposite to the second code pattern row at pitches that are obtained by dividing the angle forming the one sector by 3,
- wherein, in the gray code obtained by combining the six codes supplied from the first detecting element group, the digit place is moved one by one whenever the rotary disk is rotated by an angle obtained by dividing the angle forming the one sector by 6, which is the number of detecting elements constituting the first detecting element group, and by dividing the divided angle by a predetermined angle of resolution, and
- wherein, in the code string obtained by combining the three codes supplied from the second detecting element group, the digit place is moved one by one whenever the rotary disk is rotated by an angle obtained by dividing the angle forming the one sector by 3, which is the number of detecting elements constituting the second detecting element group, and by dividing the divided angle by a predetermined angle of resolution.

14. The absolute angle detecting device according to claim 13,
- wherein the one sector is set to 180 degrees,
- wherein the six detecting elements constituting the first detecting element group are arranged at pitches of 30 degrees, and the three detecting elements constituting the second detecting element group are arranged at pitches of 60 degrees,
- wherein, in the gray code obtained by combining the six codes supplied from the first detecting element group, the digit place is moved one by one whenever the rotary disk is rotated by 30 degrees corresponding to 20 steps, and
- wherein, in the code string obtained by combining the three codes supplied from the second detecting element group, the digit place is moved one by one whenever the rotary disk is rotated by 60 degrees corresponding to 40 steps.

15. The absolute angle detecting device according to claim 12,
- wherein the 3-bit code strings obtained by combining the three codes supplied from the second detecting element group are set to be changed one bit by one bit whenever the same code strings are repeated in the 6-bit code strings obtained by combining the six codes supplied from the first detecting element group, and the same 3-bit code strings are repeated whenever the 6-bit code strings are changed by one bit, and
- wherein the digit place of the 3-bit code strings is moved one by one whenever the 3-bit code strings are moved by 40 steps.

16. The absolute angle detecting device according to claim 15,
- wherein 9-bit code strings consisting of the 6-bit code strings and the 3-bit code strings are assigned to detect the absolute angle of a sector having an angle corresponding to a divisor of 360 degrees, such as 180 degrees, 120 degrees, 90 degrees, 72 degrees, or 60 degrees.

17. The absolute angle detecting device according to claim 12,
- wherein the combination of the eight code strings of 6 bits is obtained by combining eight code strings of 6 bits selected from (100000), (110000), (101000), (111000), (110100), (101100), (111100), (111010), and (111110).

18. The absolute angle detecting device according to claim 17,
- wherein, when the eight code strings of 6 bits are A, B, C, D, E, F, G, and H, respectively, and the number of repetitions of the eight code strings A, B, C, D, E, F, G, and H of 6 bits is $n_A$, $n_B$, $n_C$, $n_D$, $n_E$, $n_F$, $n_G$, and $n_H$, respectively, the eight code strings A, B, C, D, E, F, G, and H of 6 bits are respectively repeated a predetermined number of times to satisfy $n_A+n_B+n_C+n_D+n_E+n_F+n_G+n_H=20$.

19. The absolute angle detecting device according to claim 17,
- wherein, when the eight code strings of 6 bits are A, B, C, D, E, F, G, and H, respectively, and the number of repetitions of the eight code strings A, B, C, D, E, F, G, and H of 6 bits is $n_A$, $n_B$, $n_C$, $n_D$, $n_E$, $n_F$, $n_G$, and $n_H$, respectively, $n_A$ to $n_H$ each have a value of 2 or 3.

* * * * *

UNITED STATES PATENT AND TRADEMARK OFFICE
CERTIFICATE OF CORRECTION

PATENT NO. : 6,966,118 B2
DATED : November 22, 2005
INVENTOR(S) : Tadashi Sano

It is certified that error appears in the above-identified patent and that said Letters Patent is hereby corrected as shown below:

<u>Column 13,</u>
Line 34, after "detecting element group" delete "consists of" and insert -- contains --.
Line 42, immediately after "3" insert -- , -- (comma).

<u>Column 15,</u>
Line 3, after "detecting element group" delete "consists of" and substitute -- contains --.
Line 5, before "three detecting" delete "consists of" and substitute -- contains --.

Signed and Sealed this

Thirteenth Day of June, 2006

JON W. DUDAS
*Director of the United States Patent and Trademark Office*